June 8, 1926.

J. E. SMITH 1,587,683

STUD RING RETAINER LOCK

Filed April 19, 1924

Inventor
J. E. Smith
By Clarence A. O'Brien
Attorney

Patented June 8, 1926.                                                                                    1,587,683

UNITED STATES PATENT OFFICE.

JOHN E. SMITH, OF ARCO, IDAHO.

STUD-RING RETAINER LOCK.

Application filed April 19, 1924.  Serial No. 707,715.

This invention relates to stud ring retainer locks.

An object of the invention is to provide a locking means for locking the inner wheel bearings in the rear wheel of an automobile, in adjusted position, together with the usual retaining washer carried thereby.

Another object of the invention resides in providing an attachment for automobiles, wherein the rear wheels have a full floating or semi-floating rear axle construction, in which the inner wheel flange has a roller bearing mounting on the end of the axle housing, together with an adjusting ring therefor which is provided with a felt washer for retaining lubricant in the bearing and excluding dirt and dust therefrom, the invention including the provision of a ring member adapted to engage in the end of the hub plate of the wheel for engagement with the bearing adjusting ring, the locking ring, for the last mentioned ring having screw threaded engagement with the hub plate on the inner side of the wheel for retaining said last mentioned ring in engagement with the bearing adjusting ring for preventing the ring from becoming loose or changing its relative adjusted positions in the normal use of the automobile.

The invention also comprehends other objects and improvements in the details of construction and arrangement of the parts for carrying out the above objects which are more particularly pointed out in the following description and claim, directed to a preferred form of the invention, it being understood, however, that variations may be made in the specific construction and arrangement of these parts without departing from the spirit and scope of the invention as described and claimed.

In the drawing, forming a part of this application:

Figure 1:
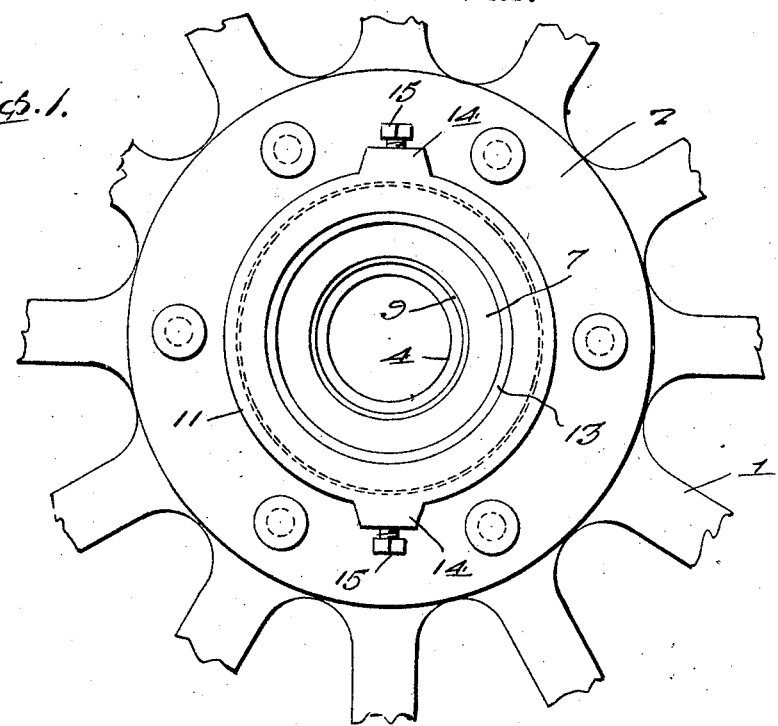
Figure 1 is an elevational view of the inner end of the rear wheel for automobiles, showing the invention applied thereto.

1 indicates the rear wheel of an automobile, having an inner hub plate 2, provided with a tubular extension 3, which is adapted to receive a roller bearing 4, which is mounted on the end portion 5 of the rear axle housing, which receives the usual axle 6. This construction shows a portion of a rear wheel and axle construction for automobiles, of the full or semi-floating type, and which is in common use and well known in the art. The inner or free end of the tubular extension 3 is threaded interiorly, as indicated at 4ª for threadedly receiving the adjusting and retaining ring 7, for the roller bearing 4, which is provided with an annular groove 8, adapted to receive and retain the usual felt washer 9, for retaining lubricant in the bearing.

Figure 2:
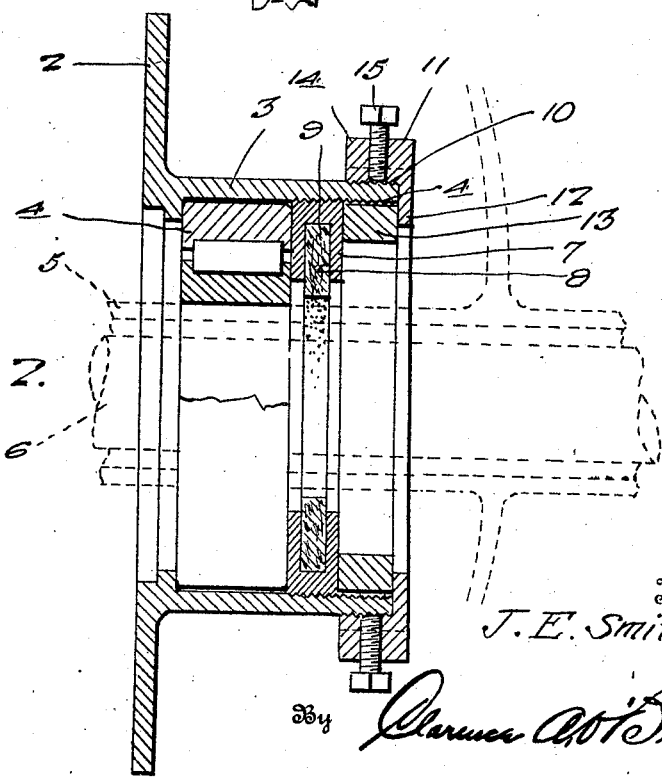
Figure 2 is a vertical longitudinal section through the hub portion of said wheel.

The improvements forming the subject of the present invention provide for threading the extensions 3 externally thereof, adjacent the end portions as indicated at 9, for receiving a locking ring 11, having an inwardly extending flange 12 adapted to retain a holding ring 13 within the end of the tubular extension 3, of the hub plate 2, and against the bearing adjusting ring 7. The locking ring 11 is provided with a pair of bosses 14, at diametrically opposite points, which are provided with threaded openings to receive locking screws 15, adapted to engage the periphery of the sleeve extension 3, in the manner shown in Figure 2, for effectively locking the ring 11, on said sleeve extension. It will be observed that it is contemplated to provide left hand screw threads on the exterior of the screw extension, where right hand screw threads are provided on the interior thereof, so that the tendency of the ring 7 to turn, in the use or operation of the wheel will not operate to effect the loosening of the locking ring 11.

With the construction as above described, it will be clearly understood that the locking ring 11 when screw threaded on the end of the sleeve 3 will force the holding ring 13 against the bearing adjusting ring 7, and effectively retain the same in an adjusted position, which will also retain the washer 9 in position for retaining the grease or other lubricant in the bearing 4. This overcomes a number of difficulties now experienced in constructions of this character, designed to retain the ring 7 in adjusted position, which have been found to be subject to various disadvantages in the operation of the wheel, as the locking means becomes disengaged from the sleeve extension 3 and permits a relative movement of the ring 7 and throws the bearing out of proper adjustment.

What is claimed is:

As a new manufacture, means to be incorporated in a conventional rear wheel construction of a well known type of motor vehicle, said means comprising an inner wheel flange formed with an integral tubular extension which is screw threaded externally in one direction and internally in the opposite direction at the free end portion thereof, there being an internal stop at the opposite end of the extension against which a roller bearing is adapted to be disposed, and a safety appliance associated with said extension, said appliance comprising a locking ring threaded upon said external threads and provided with an internally extending flange, a filler ring located in the extension and adapted to rest against said last-named flange, an adjustable retaining ring threaded into said extension and bearing against said filler ring, said locking ring being formed at diametrically opposite points with extensions, and retaining means cooperative with said extensions.

In testimony whereof I affix my signature.

JOHN E. SMITH.